Patented June 13, 1933

1,913,491

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

1-HYDROXY-ANTHRACENE-CARBOXYLIC ACID AND A PROCESS OF MAKING IT

No Drawing. Application filed May 20, 1932, Serial No. 612,631, and in Germany June 4, 1931.

The present invention relates to a 1-hydroxy-anthracene-carboxylic acid and to a process of making it, more particularly it relates to a compound corresponding with the following probable formula:

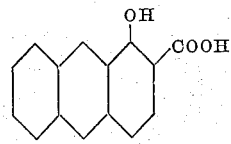

We have found that a 1-hydroxy-anthracene-carboxylic acid is obtainable by heating to a temperature of 210° C. to 250° C. an alkali metal salt of 1-hydroxy-anthracene with carbon-dioxide at a pressure of 50 atmospheres to about 120 atmospheres. As the carboxylic acid, thus obtained, exhibits a bluish-black coloration when its alcoholic solution is mixed with ferric chloride solution, the carboxylic acid group is presumed to have entered into the 2-position.

The new carboxylic acid is a valuable intermediate product for the preparation of dyestuffs.

The following example serves to illustrate the invention, but it is not intended to limit it thereto, the parts being by weight:

194 parts of 1-hydroxy-anthracene are dissolved with 56 parts of potassium hydroxide and 500 parts of water in an autoclave provided with a stirrer; thereupon the water is distilled off, finally in vacuo, while providing an atmosphere of nitrogen in order to prevent oxidation, until the potassium salt obtained is completely dried. After cooling, carbon dioxide is introduced into the reaction mass while gradually increasing the pressure to 90 atmospheres, the whole is then heated to 210° C. to 220° C. and heating is continued for 12 hours. The melt is allowed to cool and then dissolved in hot water, the solution is filtered with suction and the carboxylic acid, thus obtained, is precipitated by means of hydrochloric acid. It may be purified by dissolving it in dilute sodium acetate solution, filtering it with suction and again precipitating it by means of hydrochloric acid. The said carboxylic acid has a yellow coloration and crystallizes from o-dichlorobenzene in the form of yellow leaflets melting at 200° C. with decomposition. The acid gives in alcoholic solution a bluish-black coloration on the addition of a few drops of ferric chloride solution.

The reaction may be carried out in the same manner by using the sodium salt of 1-hydroxy-anthracene.

We claim:

1. The process which comprises heating to a temperature of 210° C. to 250° C. an alkali metal salt of 1-hydroxy-anthracene with carbon dioxide at a pressure of 50 atmospheres to about 120 atmospheres.

2. As a new product, the compound of the following probable formula:

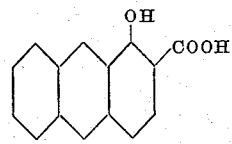

crystallizing from o-dichlorobenzene in the form of yellow leaflets melting with decomposition at 200° C. and giving in alcoholic solution a bluish-black coloration on the addition of ferric chloride solution.

In testimony whereof, we affix our signatures.

LEOPOLD LASKA.
OSKAR HALLER.